No. 889,259. PATENTED JUNE 2, 1908.
L. M. PIESTER.
SPRING TOOTH HARROW.
APPLICATION FILED OCT. 2, 1907.
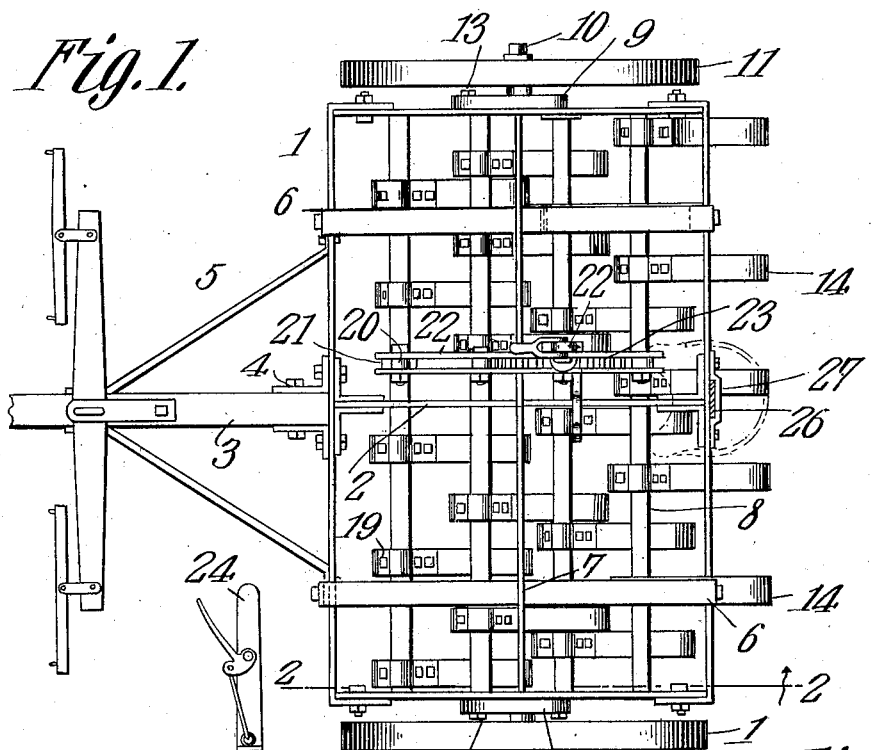
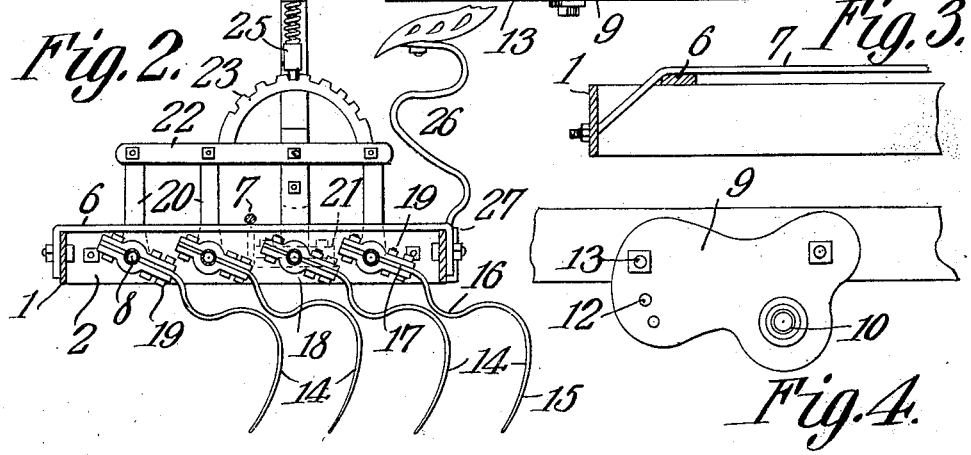
Laval M. Piester
Inventor

UNITED STATES PATENT OFFICE.

LAVAL M. PIESTER, OF WEATHERFORD, TEXAS.

SPRING-TOOTH HARROW.

No. 889,259.          Specification of Letters Patent.          Patented June 2, 1908.

Application filed October 2, 1907. Serial No. 395,595.

*To all whom it may concern:*

Be it known that I, LAVAL M. PIESTER, a citizen of the United States, residing at Weatherford, in the county of Parker and State of Texas, have invented a new and useful Spring-Tooth Harrow, of which the following is a specification.

This invention has relation to spring tooth harrows and it consists in the novel construction and arrangement of its parts as hereinafter shown and described.

The object of the invention is to provide a harrow of the character indicated which is of light and durable construction and which may be easily and readily converted from a harrow into a rake and vice versa, and having its parts so arranged that the operation of the teeth may at all times be observed by the operator.

In the accompanying drawing:—Figure 1 is a top plan view of the harrow. Fig. 2 is a transverse sectional view cut on the line 2—2 of Fig. 1. Fig. 3 is a sectional view of one end of the frame of the harrow, and Fig. 4 is a side elevation of a spindle plate used upon the harrow.

The harrow consists of the rectangular frame 1 having at its middle a bar 2. The rear end of the tongue 3 is attached between the lugs 4 fixed to the forward side of the frame 1 and the brace rods 5 are attached at their forward ends to the said tongue and at their rear ends to the forward edge of the frame 1. The braces 6 are located at the opposite sides of the bar 2 and connect the front and rear edges of the frame 1 together. The braces 6 lie in a plane above that of the frame 1 and the truss rod 7 is attached at its end to the ends of the frame 1 and passes up over the braces 6 and serves to prevent any tendency of the frame to buckle. The hollow shafts 8 are journaled at their ends in the ends of the frame 1 and pass through perforations provided in the bar 2. The spindle plates 9 are pivoted to the outer side of the ends of the frame 1 and each said plate is provided with a spindle 10 upon which is journaled a ground wheel 11. Each said plate is also provided with a series of perforations 12 through any one of which the bolt 13 may be passed for fixing the plate with relation to the frame 1.

It is obvious that by removing the bolts 13 the spindle plates 9 may be swung upon their pivots and fixed in an adjusted position whereby the frame 1 may be raised or lowered with relation to the ground. The spring teeth 14 are of peculiar configuration. Each tooth is provided with a bowed end portion 15 with a reversely bowed intermediate portion 16 and a straight upper end portion 17. Clamps 18 are provided for connecting the spring teeth to the shafts 8. Said clamps consist of binary members between which the upper end portions 17 of the teeth 14 are clamped and which in turn are secured by clamping bolts 19 to the said shafts 8. By this construction it is obvious that the teeth 14 may be easily and readily spaced at any desired distance apart and fixed with relation to the shafts when so adjusted. Also, the clamps 18 may be turned axially on the shafts 8 in order to cause the spring teeth to enter the ground at a desired depth. The arms 20 are provided with clamps 21 which also engage the shafts 8 and which may be adjusted thereon in a manner similar to that described for the clamps 18. The bars 22 are pivotally attached to the upper ends of the arms 20 and the gear segment 23 is mounted upon the bars 22. One of the arms 20 is continued into the lever 24 which is provided with a spring actuated pawl 25 adapted to engage the segment 23. The seat post 26 is attached to the rear side of the frame 1 by means of a U-shaped strip 27 within which the lower end of the seat post is slipped.

From the foregoing description it is obvious that as the operator is perched at the rear side of the frame 1 the operation of the teeth 14 may be readily observed at all times; also, by manipulating the lever 24 the shafts 8 may be turned axially so that the spring teeth 14 are lifted out of contact with the ground or forced to any desired extent into the same. It is also obvious that by removing some of the teeth 14 the implement may be used as a rake for removing trash from the surface of the ground preparatory to planting.

Having described my invention what I claim as new and desire to secure by Letters Patent is:—

An implement of the character indicated comprising a rectangular frame, wheels supporting the same, bars connecting the front and rear sides of the frame together and lying in a plane above that of the frame, a truss rod attached at its ends to the ends of the frame and passing over said bars, shafts journaled in the frame and teeth attached to said shafts.

In testimony that I claim the foregoing as my own, I have hereto affixed my signature in the presence of two witnesses.

LAVAL M. PIESTER.

Witnesses:
  W. M. CAMPBELL,
  G. A. HOLLAND.